Dec. 26, 1939. J. A. PURVIS 2,185,017
BALANCED WHEEL ASSEMBLY
Filed March 8, 1937
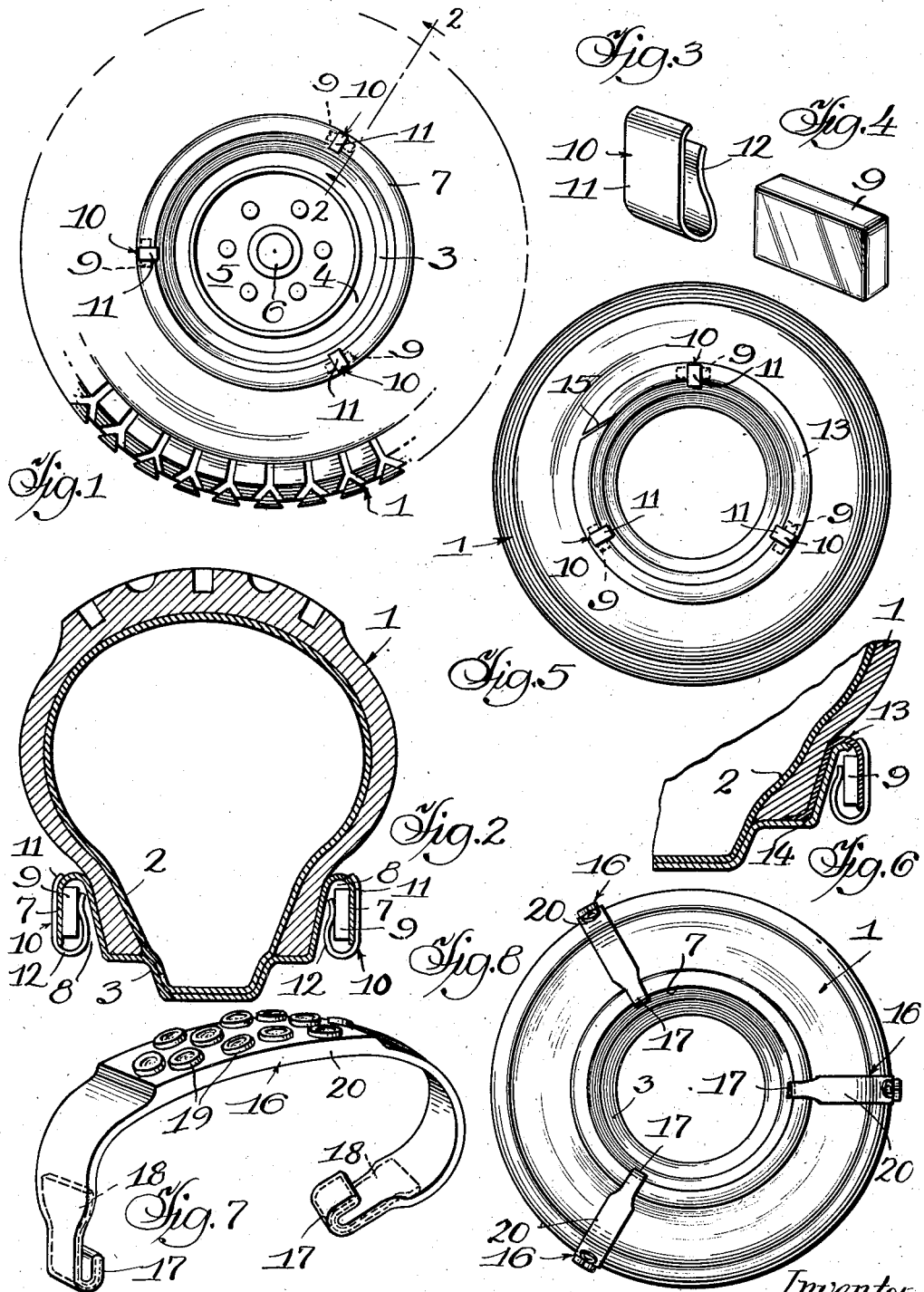
Witness:
Chas. L. Kowsh
Inventor,
Judson A. Purvis,
Parkinson Lane Attys.

Patented Dec. 26, 1939

2,185,017

UNITED STATES PATENT OFFICE 2,185,017

BALANCED WHEEL ASSEMBLY

Judson A. Purvis, Chicago, Ill.

Application March 8, 1937, Serial No. 129,577

2 Claims. (Cl. 301—5)

The present invention relates to wheel assemblies and more in particular to a novel means and method of balancing wheel assemblies of an automobile or other vehicle.

Automobiles at the present time are being built for higher road speeds and this, in combination with the decreased diameter of the wheels employed, requires that the wheels be rotated at appreciably higher speeds than formerly. The rotation of the wheels at such high speeds causes centrifugal and gyroscopic forces to be set up therein which interfere with the proper control and steering of the automobile unless the wheel assemblies are accurately and properly balanced. Such an assembly consists of all the rotating parts and includes the tire, tube, rim, wheel, brake drum, hub and other parts which rotate as a unit or mass, and it should be readily apparent that a condition of unbalance may exist in any one or more of these parts of the assembly.

It will be readily appreciated that due to the high road speeds at which the present day automobiles travel, it is highly important for automotive purposes that the wheel assemblies be mounted and maintained in dynamic or rotating balance since the undesirable effects resulting therefrom are not apparent until the wheels are rotating at a relatively high rate of speed. Also, the force applied to a rotating wheel assembly is resisted in a manner similar to that applied to a rotating gyroscope, and another force is created acting at right angles to the force applied. Therefore, a wheel assembly which is out of balance will have a tendency to wobble at right angles to the plane of rotation, an action which is familiarly known as "shimmy" or "tramp," and causes a loss of steering control of the front wheels of an automobile.

Although it is possible to balance the wheel parts making up the assembly by the manufacturer, the addition of the tire and tube may offset such balance. But as the wheel is retained on the hub by a plurality of bolts spaced therearound, a slight variation in the bolt holes can offset such balance and the wheel may be mounted out of balance each time it is removed from the hub. Furthermore, as a practical proposition, it is not commercially possible for the manufacturer to hold the production within the extremely close limits required for proper balance. Even were it commercially possible to maintain the wheel assembly within the proper or required limits, there is still the problem of balance in the tire and tube, which being mounted on the rim of the assembly will be farthest removed from the center of rotation and will, therefore, create more force with a smaller amount of unbalance than a part nearer the hub. Also, the tire is subject to wear and distortion which may soon throw the assembly out of balance.

Thus it will be apparent that it is highly desirable to balance the entire wheel assembly each time it is removed and replaced upon the hub, and each time that the tire is removed and replaced, as well as to occasionally restore balance when normal wear has caused a condition of unbalance to exist. Failure to do so will cause a condition to exist which may become extremely troublesome and frequently dangerous, materially affecting the proper control and steering of the automobile, and causing undue wear upon various parts thereof.

It has been proposed to balance the wheel of an automobile by means of adjustable balancing weights applied to one side of the rim but such contemplated structures have not been found commercially satisfactory. One of the objections to these prior types is that set screws or similar attaching means were employed, thus requiring a non-ferrous or expensive metal, necessitating machining operations and making the structure considerably more expensive to manufacture than the present simple device. Another objection is that these prior proposed weights have a tendency to fly off by reason of centrifugal force produced when the wheel is rotating, while in the present novel arrangement centrifugal force is utilized to help retain the balancing weights in their predetermined adjusted position. A still further objection to the prior types is that friction between the inflated tire and the rim is relied upon to hold or help hold the weights in place; while another objection thereto is the danger of the weights being brushed or knocked off on contact with the curb.

It is, therefore, an object of the present invention to provide a novel means and method of balancing wheel assemblies whereby to entirely eliminate or minimize the hazards incident to an unbalanced wheel assembly, particularly when travelling at a relatively high rate of speed.

Another object is to provide a novel wheel assembly having simple and readily accessible means for quickly and accurately balancing the entire assembly.

A further object is to provide in a wheel assembly a novel construction of rim provided with means for accurately balancing the entire wheel assembly. In the preferred embodiment, it is contemplated to form or provide the opposite sides of the rim with an inwardly turned flange for receiving and retaining suitably spaced balancing weights. These flanges, being of similar structure and contour, add nothing to the rim which would serve to throw it out of balance.

A still further object is to provide a novel rim construction having means for receiving and anchoring balancing means, and also providing anchoring means for the quick application of emergency chains.

Further objects are to provide a construction of maximum simplicity, efficiency, economy and ease of assembly, and such further objects, advantages and capabilities as will later more fully appear and as are inherently possessed thereby.

The invention further resides in the combination, construction and arrangements of parts illustrated in the accompanying drawing, and while there is shown therein a preferred embodiment, it is to be understood that the same is susceptible of modification and change, and comprehends other details and constructions without departing from the spirit of the invention.

In the drawing:

Fig. 1 is a view in rear elevation of a wheel assembly provided with the novel balancing means.

Fig. 2 is a view in vertical cross section of a tire and rim provided with the novel balancing means.

Figs. 3 and 4 are perspective views of one of the weights and retaining clips.

Fig. 5 is a view similar to Fig. 1 but showing an alternate construction.

Fig. 6 is a fragmentary view in vertical cross section of the construction disclosed in Fig. 5.

Fig. 7 is a view in perspective of an emergency chain for use with the novel rim construction.

Fig. 8 is a view in side elevation of a wheel assembly upon which has been mounted a plurality of the novel emergency chains.

Referring more particularly to the disclosure in Figs. 1 to 4 inclusive, of the drawing, the wheel assembly is shown as comprising a tire or casing 1, tube 2, rim 3, wheel 4, brake drum 5 and hub 6. The rim 3 is formed or provided on both sides with an outwardly and downwardly or inwardly turned flange 7, forming an annular inwardly opening channel 8 between the main body of the rim and the flange for the reception of balancing weights 9. These weights are preferably blocks of any suitable metal and of any suitable size or shape, but adapted to be received in channels 8 and retained therein by spring clips 10. Each clip is preferably of substantially U-shape, with its outer leg 11 adapted to conformably seat upon and anchor onto the flange 7 and its other leg 12 so curved as to provide a tension grip upon the weight 9 and retain it against the interior of the flange. Thus it will be readily seen that the weight is wholly disposed within the channel and cannot be brushed or knocked off by contact with the curb while at the same time, it cannot become detached or fly off by reason of centrifugal force produced when the wheel is rotating at a high speed. Centrifugal force would have no effect thereon and thus any danger of these weights becoming detached, and causing damage by reason thereof, is completely eliminated.

In Figs. 5 and 6 there is disclosed an alternate construction in which the rim flange 13 is made separate and then anchored upon the body of the rim upon one or both sides thereof. In this form of the invention, the rim flange is provided with a part 14 closely conforming with the contour of the rim and upon which the tire or casing 1 seats, the flange being split at 15 to permit a ready attachment, removal or replacement. If desired, merely the flange 13 need be continuous, and the part 14 may be in the form of projections.

Another distinct advantage of this type of rim flange, whether made integral with body of the rim or as an attachment thereto as in Figs. 5 and 6, is that it provides a quick anchorage for an emergency or auxiliary chain for adding traction to the wheel. The present trend of wheel design for automobiles, airplanes, etc., is to employ disc wheels having no spokes. Numerous manufacturers also partially enclose the tires and wheels with overhanging or skirted fenders. With these overhanging or skirted fenders, it is extremely difficult or impossible to install tire chains in an emergency if the chains are of the conventional "all-around" type. Emergency chains of the snap-on type can only be used if slots are cut in the disc wheels, through which the retaining straps can be passed so that they may encompass or encircle the rim.

With the present design of rim, I disclose a novel construction of a flexible emergency chain 16 having each of its ends formed to provide a hook portion 17 adapted to be hooked over a flange 7 on the rim. The chain is preferably provided at its ends with a metal core 18 to add rigidity thereto, and the central portion is preferably studded with metal cups or the like 19 embedded in the flexible band 20. It will be clearly evident that with this type of emergency chain it would be a simple matter to mount one or more of them upon the wheel by reaching around the tire, hooking the open hook upon the inner flange, and stretching the band over the tire until the hook on the other end of the band could be snapped over the outer flange. Removal of the chains when not needed is equally simple. As these chains are preferably of rubber except for the embedded metal, they will not injure the tire or slip on it as the co-efficient of friction between rubber and rubber is quite high.

From the above disclosure, it will be apparent that the novel invention has numerous distinct and important advantages over prior structures, both as an adjustable balancing means for the wheel assembly and as an emergency chain arrangement. As for the balancing feature, no dependance is placed upon the friction created by pressure between the tire and rim so that the wheel may be balanced when the tire is inflated, and there is no danger of the weights becoming lost or detached when the tire is deflated. In the prior devices where the weights are retained by friction between the tire and rim, it is necessary to deflate the tire to shift the weights and balance the wheel. But since the wheel must be in balance when inflated, it may be necessary to deflate and shift the weights a number of times until the wheel is brought into balance.

Furthermore, the present construction is such that it utilizes centrifugal force to help hold the weights in place and they cannot be thrown off at high speeds. This is important from a safety angle as a weight becoming detached and flying off at high speed would have a high velocity and could cause serious injury to anyone who happened to be in the line of flight. A further advantage is that no retaining screws or the like are necessary and thus machining, such as shaping, slotting, drilling, tapping, etc., can be dispensed with. Any cheap metal suitable for the purpose can be employed.

Having thus disclosed the invention, I claim:

1. In a balanced wheel assembly for automobiles, a rim therefor provided on its opposite sides with an outwardly and downwardly turned flange forming an annular inwardly opening continuous channel for the ready reception, removal or adjustment of balancing weights throughout the extent of the channel, adjustable balancing weights adapted to be received within the channels and spring retaining members for retaining the weights in predetermined adjusted position, said channels and weights being so positioned and arranged that the balancing weights can not become detached by centrifugal force and thereby eliminating the danger of the weights becoming detached and thrown off or lost when the wheel is rotated at a high speed, said separate flange being U-shaped in cross section and having one leg located between the tire and the rim.

2. In a wheel assembly for automobiles, a rim therefor provided on its opposite sides with a separate flange anchored in place upon the rim and extending inwardly toward the axis of the wheel and providing a continuous inwardly opening channel between the body of the rim and the flange, balancing weights adapted to be adjustably mounted wholly within the channels and maintained in such predetermined adjusted position unaffected by centrifugal force, and means for tensionally retaining the weights in the channel, said separate flange being U-shaped in cross section and having one leg located between the tire and the rim.

JUDSON A. PURVIS.